G. B. COLLIER.
GOGGLES.
APPLICATION FILED JAN. 3, 1911.
999,630.
Patented Aug. 1, 1911.
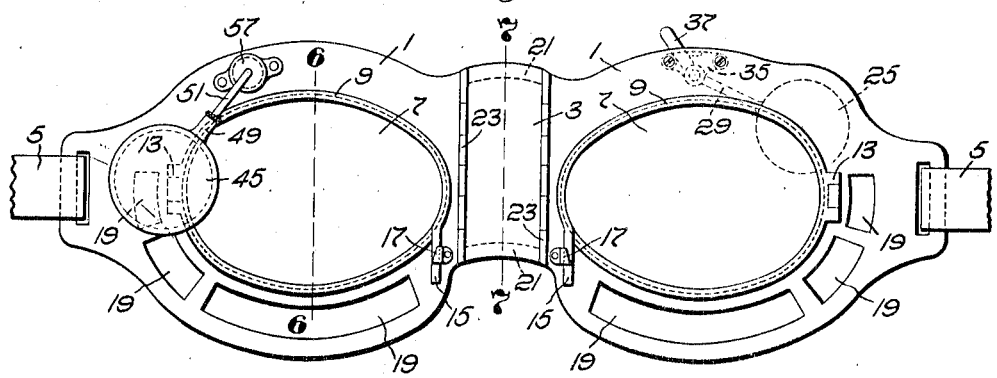
Witnesses:
Horace A. Crossman
Carl L. Choate
Inventor:
Guy B. Collier,
by Emery, Booth, Janney & Varney
Attys

UNITED STATES PATENT OFFICE.

GUY B. COLLIER, OF KINDERHOOK, NEW YORK, ASSIGNOR TO COLLIER AUTOMOBILE GOGGLE COMPANY, OF CAMBRIDGE, MASSACHUSETTS, A CORPORATION OF MASSACHUSETTS.

GOGGLES.

999,630. Specification of Letters Patent. Patented Aug. 1, 1911.

Application filed January 3, 1911. Serial No. 600,405.

*To all whom it may concern:*

Be it known that I, GUY B. COLLIER, a citizen of the United States, and a resident of Kinderhook, in the county of Columbia and State of New York, have invented an Improvement in Goggles, of which the following description, in connection with the accompanying drawings, is a specification, like letters on the drawings representing like parts.

This invention relates to goggles such as are worn in automobiles and other vehicles and among other objects provides an improved form of goggles and devices coöperating therewith.

The character of the invention may be best understood by reference to the following description of an illustrative embodiment thereof shown in the accompanying drawing, wherein:

Figure 1 is a front elevation of goggles and devices adapted to be used in connection therewith embodying the invention; Fig. 2 on an enlarged scale is a detail of a mirror shown in Fig. 1; Fig. 3 is a section taken on line 3—3 of Fig. 2; Fig. 4 on an enlarged scale is a detail of a shutter shown in Fig. 1; Fig. 5 is a side elevation of Fig. 4; Fig. 6 is a section taken on line 6—6 of Fig. 1; Fig. 7 is a section taken on line 7—7 of Fig. 1; and Fig. 8 is a detail view to be referred to.

The goggles shown herein as embodying the invention comprise a frame or casing of aluminum or other material formed to present portions 1 inclosing the eyes and a bridge portion 3 connecting said eye portions. The edges of the casing are curved to conform to and closely fit the contour of the face of the wearer. The bearing portions of the casing may be lined with chenille or other cushion material. The goggles casing may have usual ventilation vents (not shown) properly distributed. The temple ends of the eye portions of the casing may be slotted to receive bands 5 adapted to be passed around the head and be connected together in the usual manner to securely hold the goggles in place.

Glasses 7 having rims 9 may be inserted in apertures in the eye portions of the casing, said rims being rabbeted as at 11 (Fig. 6) to permit the rims to be seated in said apertures with a tight fit and effectually prevent any dust from working into the interior of the goggles.

Heretofore, considerable difficulty has been experienced from the clouding of the glasses owing to the condensation of moisture thereon. For example, when riding, the temperature at the opposite sides of the glasses will be substantially the same and the glasses will remain clear, but on stopping, the circulation of air to the inside of the goggles is less efficient, and as a result the glasses quickly become clouded or steamed. To provide glasses which may be quickly opened or swung out from the casing in order that the wearer may see clearly on stopping the rims 9 of the glasses are provided at their temple ends with hinges 13 connecting the glasses to the casing and adjacent their opposite ends are provided with depending fingers 15 preferably of resilient material, said fingers being secured fast to the rims of the glasses and are secured in their closed positions by their engagement with shoulders of catches 17 (Fig. 8) secured to the casing adjacent said depending fingers. When it is desired to open the glasses it is merely necessary to grasp the depending latches and press them away from their catches against their inherent resilience and then without releasing the hold on said fingers, the glasses may be swung on their hinges into open positions. When the glasses are open the temperature at their opposite sides will be the same and as a result the glasses will quickly become clear and then may be swung back into closed positions. In closing the glasses it will not be necessary to latch the fingers manually since they will slide on the inclines of the catches automatically down beneath the locking shoulders thereof.

To increase the range of vision, supplemental glasses may be provided. Herein around each of the main glasses, the casing is provided with three glasses 19, but, if desired, one continuous glass might be used in their stead. These supplemental glasses, it will be observed, are mounted in a curved portion of the frame and permit the eye to readily visualize objects near to the wearer beneath the goggles and at the sides thereof. As present goggles are constructed they interfere considerably with the wearing of ordinary eye glasses or spectacles and render their wearing uncomfortable if not impossible. One of the objects of the invention is to provide goggles which may be readily worn over usual eye glasses or spectacles without interfering therewith. To this end the bridge piece referred to is provided with lift strips 21 adjacent the opposite ends thereof preferably of cushioned material, one of said strips being adapted to rest on the nose and the other strip being adapted to rest against the forehead above the nose. These strips will cause the bridge proper to be spaced from the nose and leave plenty of room for the occupancy of the eye glasses.

In order that the bridge piece may seat itself naturally and evenly on the wearer, it is preferably connected to the eye portions of the frame by hinges 23 conveniently extending the length of said bridge piece and thereby preventing the occurrence of any space between the bridge piece and the eye portions of the casing, such as might permit the entrance of dust.

At night the glare of the powerful lights of approaching automobiles frequently blinds a person approaching in an automobile in the opposite direction thereby rendering steering difficult. One of the objects of the invention is to provide a shutter of smoked or other glass which may be readily positioned in front of one or both eyes of the wearer as desired. In practice it will probably be sufficient to use but one shutter which preferably would be provided for the left eye of the wearer which would be closest to a passing vehicle. Herein I have shown a smoked glass 25 (Figs. 1, 4 and 5) which is adapted to be adjustably mounted within the goggles between the same and the face of the wearer. This glass is carried in a rim 27 provided with an arm 29 having a boss 31 for receiving a fulcrum screw 33 adapted to be threaded into a bracket block 35 detachably secured to the inside of the casing above the left glass thereof by screws 36. Said arm may be continued upwardly beyond the edge of the casing to present a handle 37 for swinging the glass to and from operative and inoperative positions, said handle being guided in a space 39 between said block and casing. To secure or lock the handle in predetermined operative and inoperative positions, the block may have notches 41 at its ends and the handle or arm may be of resilient material so that when the handle is swung to the ends of the guide it will automatically spring into said notches and thereby securely maintain the smoked glass in front of the eye when in one position and up beneath the casing at the temple end thereof when in inoperative position.

It will be apparent that to adjust the smoked glass to and from operative and inoperative positions, it is merely necessary to slide the finger along the upper edge of the case exteriorly thereof until it engages the rocking arm.

If it is desired to remove the glass or substitute an amber glass for day use or a glass of different character therefor, it is merely necessary to remove the block securing screws 36 or the fulcrum screw 33 and the glass carrying arm or the arm together with the block may then be readily removed from the casing.

It is very desirable at times to be able to see objects at the rear of the automobile without turning the head. To this end there is provided a small, round mirror 43 (Figs. 1, 2 and 3) connected to the frame adjacent the right hand eye when the steering wheel is placed on the right hand side of the automobile. If the steering wheel were at the left side of the automobile, the mirror would be placed over the left eye. An important feature of the mirror shown herein is its range of adjustment permitting a ready orientation and movement to its proper position relative to the eye. To this end the mirror is mounted in a disk-like back 45 conveniently bent at its edge to present a bevel 47 for holding the glass and having a boss 49 bored to receive the threaded end of an elbow arm 51, said boss being retained on said arm in its positions of adjustment by a suitable set nut 53. To provide a swinging adjustment of the mirror on the frame said elbow arm may have a head 55 (Fig. 3) contained within a cap 57 having ears riveted or otherwise secured to the frame. The contiguous faces of the head and cap may have radial ridges 59, or be otherwise roughened to resist rotative movement of said head in said cap. To press said head against the base of said cap a helical or other spring 61 may be interposed between said head and said casing.

By the construction described, the mirror may be swiveled or rotated on the elbow arm to the desired angle, and may be swung relatively to the eye by the rotative mounting of the elbow arm within the cap and automatically be held in its position of adjustment.

By my invention there are provided goggles which are simple in construction and cheap to manufacture. When the glasses become clouded, it is not necessary to take the trouble of removing the goggles from the face, but it will merely be necessary to swing the glasses open and the glasses will remain connected to their frame and be in readiness to be closed just as soon as they have been cleared. The goggles, by the bridge construction described, will not interfere with the use of usual eye glasses or spectacles. By a simple and quick adjustment the smoked glass may be swung to and from a position in front of the eye to prevent blinding thereof from the glare of approaching automobiles while the goggles are in their normal position on the wearer and without the necessity of removing the goggles in making these adjustments. The smoked glass and its mounting are always covered by the goggles casing and are thereby protected from dust. The mirror, in being mounted directly on the goggles, permits the wearer to readily see objects at the rear of the automobile without the necessity of moving the body to a certain predetermined position such as is necessary where mirrors are mounted on the body of the vehicle. The supports of the smoked glass and the mirror are minute and inconspicuous and prevent any substantial disfigurement of the goggles.

Having described one embodiment of my invention without limiting myself thereto, what I claim as new and desire to secure by Letters Patent is:

1. In automobile goggles and the like, the combination of an eye-shielding shutter and means adjustably to connect said shutter to said goggles, said means having provision permitting the adjustment of said shutter into and out of predetermined operative and inoperative positions while the goggles are in their normal position on the wearer.

2. In automobile goggles and the like, the combination of an eye-shielding shutter and means adjustably to connect said shutter to said goggles, said means having provision for locking said shutter in operative and inoperative positions.

3. In automobile goggles and the like, the combination of a casing and eye-glasses therein with a shutter connected to said casing adjacent one of said glasses, and a mirror connected to said casing adjacent the other glass, said shutter and mirror being adjustable to and from operative and inoperative positions.

4. In automobile goggles, the combination of a frame having glass receiving portions and a bridge portion of substantial width sufficient to conform to the nose of the wearer and having its sides hinged to said portions to permit the natural seating of said bridge portion on the face of the wearer and prevent interference with glasses worn beneath the goggles.

5. In automobile goggles, the combination of a frame having glass receiving portions; a bridge portion connecting said glass receiving portions and of a width sufficient to conform to the nose of the wearer; and means to space said bridge portion from the nose of the wearer to prevent interference with glasses worn beneath the goggles.

6. In automobile goggles, the combination of a frame having glass receiving portions; a bridge portion of substantial width sufficient to conform to the nose of the wearer and having its sides connecting with said portions; and lift means adjacent the upper and lower ends of the bridge portion for raising the latter from the nose of the wearer to prevent interference with glasses worn beneath the goggles.

7. In automobile goggles, the combination of a casing having glass receiving portions; an eye protecting shutter inclosed within the goggles; and means accessible from the exterior of said casing for adjusting said shutter to and from a position in front of the eye.

8. In automobile goggles, the combination of a casing having glass receiving portions; an eye protecting shutter inclosed within said casing; a bracket secured to said casing having a guide-way; and an arm carrying said glass, pivoted to said bracket and projecting through said guide-way, whereby to adjust said shutter to and away from a position in front of the eye of the wearer.

9. In automobile goggles, the combination of a casing having glass receiving portions; an eye protecting shutter; a bracket on said casing provided with a guide-way having locking notches; and an arm carrying said shutter pivoted to said block and adapted to be seated in one or another of said notches to hold said glass in operative and inoperative positions.

10. In automobile goggles, the combination of a frame having glass receiving portions; an eye protecting shutter within said frame; a bracket block having a guide-way and locking notches; an arm carrying said glass pivoted to said bracket and having a resilient portion projecting through said guide-way and adapted by its inherent resiliency to seat itself in said notches when said arm is swung to move the glass to and away from a position in front of the eye of the wearer.

11. In automobile goggles, the combination of a frame having glass receiving portions; glasses therein; and a mirror having a rotative and rocking connection with said frame to permit a proper orientation of said mirror.

12. In automobile goggles, the combination of a frame having glass receiving portions; an arm having an adjustable rotative connection with said frame; and a mirror having a swivel adjustment on said arm.

13. In automobile goggles, the combination of a frame having glass receiving portions; a mirror; and adjustable means to connect the same with said frame adjacent one of the glasses thereof comprising a cap on said casing, an arm having a head received by said cap and yielding means permitting adjustment of said head in said cap.

14. In automobile goggles, the combination of a frame having glass receiving portions; a mirror; and means adjustably to connect the latter with said frame, comprising a cap on said frame, an arm having a head contained within said cap, said head and cap having opposed roughened faces for resisting rotative movements of said head in said cap, and yielding means for pressing said head against the base of said cap.

15. In automobile goggles and the like, the combination of a casing and eye-glasses therein with an eye shielding shutter connected to said casing adjacent one of said glasses and a mirror for permitting visualization of objects at the rear of the wearer, said mirror being connected to said casing adjacent the other glass.

In testimony whereof, I have signed my name to this specification, in the presence of two subscribing witnesses.

GUY B. COLLIER.

Witnesses:
 ROBERT H. KAMMLER,
 HENRY T. WILLIAMS.